US012705914B2

(12) United States Patent
Shetty

(10) Patent No.: US 12,705,914 B2
(45) Date of Patent: Aug. 11, 2026

(54) INTELLIGENT AND MODE-BASED OPTICAL CHARACTER RECOGNITION

(71) Applicant: Omnissa, LLC, Mountain View, CA (US)

(72) Inventor: Rohit Pradeep Shetty, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 403 days.

(21) Appl. No.: 18/244,318

(22) Filed: Sep. 11, 2023

(65) Prior Publication Data

US 2025/0022298 A1 Jan. 16, 2025

(30) Foreign Application Priority Data

Jul. 13, 2023 (IN) ............................ 202341047223

(51) Int. Cl.
*G06V 30/18* (2022.01)
*G06V 30/19* (2022.01)

(52) U.S. Cl.
CPC .... *G06V 30/1801* (2022.01); *G06V 30/19113* (2022.01)

(58) Field of Classification Search
None
See application file for complete search history.

(56) References Cited

U.S. PATENT DOCUMENTS 5,859,636 A * 1/1999 Pandit .................. G06F 40/279 715/204
5,946,647 A * 8/1999 Miller .................. G06F 40/289 704/9
8,489,388 B2 * 7/2013 Bonnet ................ G06F 40/216 707/755
2022/0138026 A1 * 5/2022 Poole ..................... G06F 9/546 719/313

* cited by examiner

*Primary Examiner* — Edward Park
(74) *Attorney, Agent, or Firm* — Kim & Stewart LLP

(57) ABSTRACT

Disclosed are various embodiments for intelligent text recognition based upon a selected pattern detection mode. First, text can be identified in an image. A pattern detection mode can be selected by a user or autonomously. In some instances, the pattern detection mode can be selected based at least in part on a user account. Next, the text can be parsed for occurrences of a pattern associated with the selected pattern detection mode. A list of occurrences of the pattern can be generated from the text and presented to a user. In some instances, a user can train a model to learn a new pattern.

15 Claims, 6 Drawing Sheets

INTELLIGENT AND MODE-BASED OPTICAL CHARACTER RECOGNITION

RELATED APPLICATIONS

Benefit is claimed under 35 U.S.C. 119 (a)-(d) to Foreign application No. 202341047223 filed in India entitled "INTELLIGENT AND MODE-BASED OPTICAL CHARACTER RECOGNITION", on Jul. 13, 2023, by VMware, Inc., which is herein incorporated in its entirety by reference for all purposes.

BACKGROUND

Optical Character Recognition ("OCR") is an important feature in many imaging applications which helps a user identify text in an image. OCR can recognize text in an image and convert the image of text to machine-encoded text. Once the text is converted to machine-encoded text, a user can search the text as well as select and copy a relevant portion of text. However, if a user wants to select multiple portions of relevant text, it may take many iterations of selecting and copying one portion at a time, switching applications, pasting the portion of text, and returning to the text to repeat the same.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for scanning images and extracting certain types of data from text within the image. Optical Character Recognition ("OCR") is an important feature in cameras as well as standalone applications. Users, be it personal or enterprise, utilize OCR to select text from pictures, physical invoices, brochures, billboards, etc. In addition, OCR can be used to search images and scanned documents for specific text.

Known OCR technology identifies all the text in an image and allows a user to select and copy the same. Selecting relevant text, while helpful, does not provide the flexibility and ease of use a user might desire especially when selecting several items from the text scanned. In some cases, it might even be laborious to select a single item, copy, and paste it in another application and then to return to the OCR feature to select a second item and repeat the process. As an example, if a user wishes to copy all email addresses that appear in a body of text, the user will have to read the entire body of text and select, copy, and paste each email address as it occurs. Such a process is laborious, and a user is likely to miss email addresses by skim-reading. While email addresses are used as an illustrative example, it is noted that any other information or items of text may be substituted.

As such, various embodiments of the present disclosure are directed to intelligent text recognition based upon a selected pattern detection mode. A pattern detection mode can be selected by a user or autonomously selected based on a likely user preference associated with a user account. Additionally, a user can train a model to learn a new pattern. The text can be parsed for occurrences of the pattern, and occurrences can be saved to a list. The list can be presented to a user, who is then able to copy and paste all occurrences at the same time, or selectively copy and paste occurrences. This grants the user greater flexibility and ease of use compared to known OCR technology.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
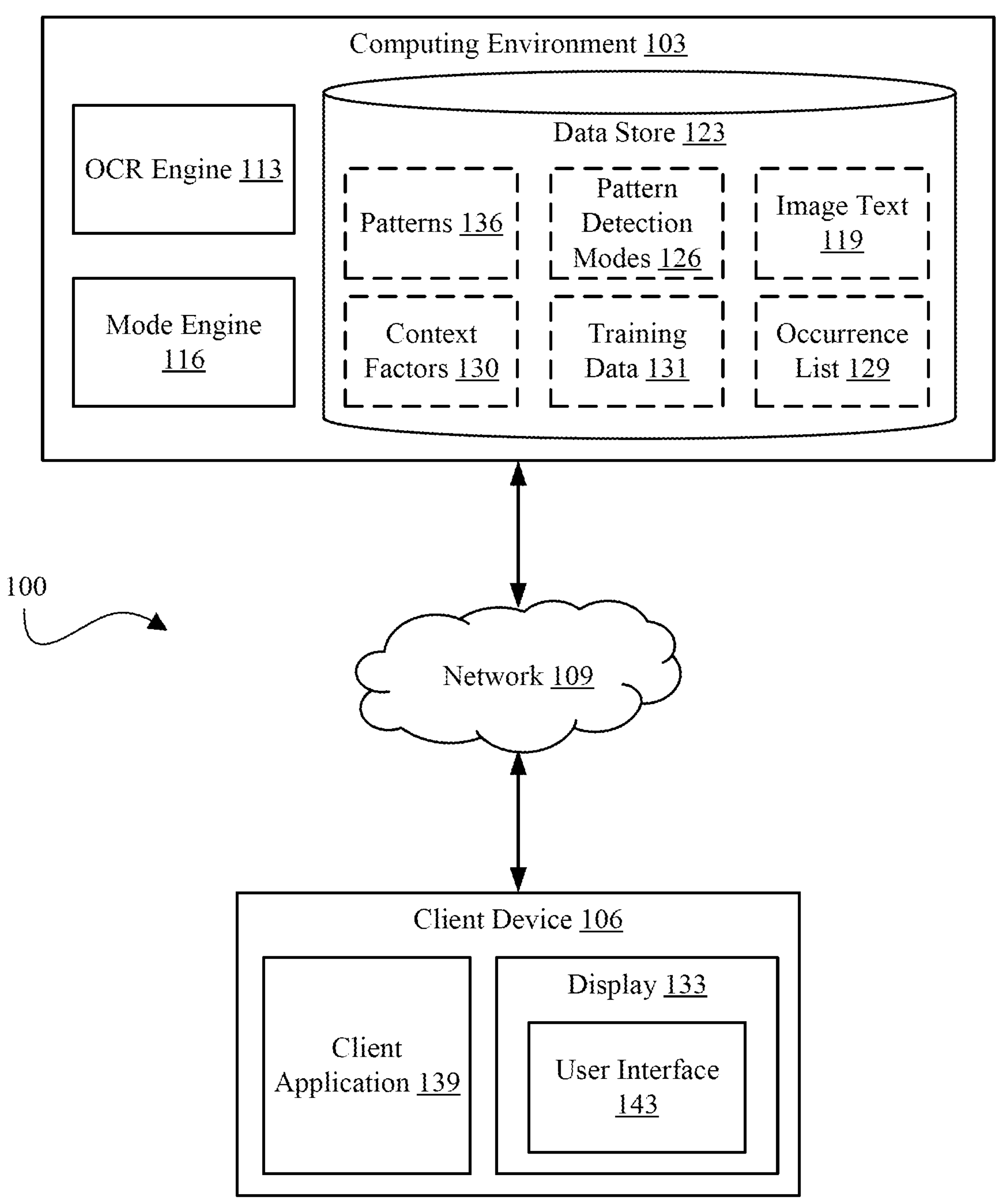
FIG. 1 is a drawing of a network environment according to various embodiments of the present disclosure.

With reference to FIG. 1, shown is a network environment 100 according to various embodiments. The network environment 100 can include a computing environment 103 and a client device 106 which can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dialup, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include an Optical Character Recognition ("OCR") engine 113, a mode engine 116, and other applications, services, processes, systems, engines, or functionality not discussed in detail herein.

The OCR engine 113 can identify text in images. In one example, as further described in FIG. 3, the OCR engine 113 can be executed to obtain an image containing text. Next, the OCR engine 113 can identify the image text 119. Next, the OCR engine 113 can store the image text 119 in a data store 123 of the computing environment 103. In some embodiments, the OCR engine 113 can be part of the Operating System (e.g., Android OS, iOS, etc.) of a computing environment 103. Further information about the execution of the OCR engine 113 is further described in the description of FIG. 3.

Additionally, the OCR engine 113 can identify and extract content from files that can be otherwise difficult to interpret, such as image files (e.g., JPG, PNG, BMP, TIFF, GIF, EPS, RAW, etc.), Portable Document Format ("PDF") files, and similarly difficult to interpret file types. For example, the OCR engine 113 can receive a screenshot image of website and process the image to identify and extract any image text 119 displayed in the screenshot image. The OCR engine 113 can deliver any such extracted image text 119 to the mode engine 116.

The mode engine 116 can obtain particular occurrences of text patterns from the image text 119 obtained by the OCR engine 113. In some embodiments, further described in FIG. 4, the mode engine 116 can be executed to obtain the image text 119. The mode engine 116 can select a pattern detection mode from a plurality of pattern detection modes 126. In addition, the mode engine 116 can parse the image text 119 to identify occurrences of the pattern associated with the selected pattern detection mode 126 and save these occurrences to an occurrence list 129. The mode engine 116 can send the occurrence list 129 to a display 133 on a client device 106.

Also, various data is stored in a data store 123 that is accessible to the computing environment 103. The data store 123 can be representative of a plurality of data stores 123, which can include relational databases or non-relational databases such as object-oriented databases, hierarchical databases, hash tables or similar key-value data stores, as well as other data storage applications or data structures. Moreover, combinations of these databases, data storage applications, and/or data structures can be used together to provide a single, logical, data store. The data stored in the computing environment data store 123 is associated with the operation of the various applications or functional entities described below. This data can include image text 119, patterns 136, pattern detection modes 126, occurrence lists 129, context factors 130, and potentially other data.

Image text 119 can represent the machine-encoded text which the OCR engine 113 generates from images. An example of image text 119 is depicted and further described in the discussion of FIG. 2. Image text 119 can include any and all text found in an image obtained by the OCR engine 113.

Patterns 136 can also be stored in the data store 123. The patterns 136 can represent various rules to identify a type of information, with each pattern corresponding to a formatted string of characters which can be identified in the image text 119. For example, a pattern 136 could be representative of email addresses and correspond to a string of consecutive characters having at least an "@" symbol and "domain" with no spaces between characters. In a similar manner, a pattern 136 could be representative of phone numbers and correspond to a string of ten consecutive numbers which may include parenthesis, dashes, spaces, or a plus sign. Other examples of patterns 136 include, but are not limited to, website domain names, street addresses, personal identification numbers (PINs), dates, times, usernames, various item/order or tracking numbers, or any other type of specially formatted pattern. In some embodiments, the pattern 136 can be representative of a plurality of patterns or regular expressions associated with a selected pattern detection mode 126. A pattern 136 can be represented as a regular expression that can be utilized by the OCR engine 113 or mode engine 116 to identify patterns in text.

In addition, pattern detection modes 126 can also be stored in the data store 123. A pattern detection mode 126 can represent a mode which is associated with a specific pattern 136. When a pattern detection mode 126 is selected, the pattern detection mode 126 can be used by the mode engine 116 to determine which pattern 136 to search for within the image text 119. Further details of the selection of pattern detection modes 126 are described in the discussion of FIG. 4.

Occurrence lists 129 can also be stored in the data store 123 of the computing environment 103. An occurrence list 129 can represent all the occurrences of a pattern 136 identified from the image text 119 by the mode engine 116. An occurrence list 129 can include each occurrence identified by the mode engine 116 as well as the total number of occurrences and/or other information or context about each occurrence.

The data store 123 of the computing environment 103 can also include a plurality of context factors 130. The plurality of context factors 130 can include, for example, a mode selection history, a user interaction history, a client device location, a time, a date, the image text 119, and/or other data and information that provides context regarding the likely mode selection preferred by the user. For example, a mode selection history can include past selection patterns of the user including such information as which mode is most often selected by the user and which mode the user selected most recently. A user interaction history can include information about user interactions with other applications or services. For example, user interaction history can include information about the type of application from which the OCR engine 113 was launched. In addition, user interaction history can include the type and content of the current body of work of the user, the location of the user's cursor, the user's past searches, and any other information which may give context to which pattern detection mode 126 the user may prefer.

Training data 131 can also be stored in the data store 123 of the computing environment 103. Training data 131 can include one or more training phrases (e.g., example strings of characters in the desired format or pattern), one or more rules about the format or structure of the new pattern, or other forms of training data 131. In addition, training data 131 can include one or more patterns 136 and/or one or more regular expressions.

The client device 106 is representative of a plurality of client devices that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 133, such as liquid crystal displays (LCDs), gas plasma-based flat panel displays, organic light emitting diode (OLED) displays, electrophoretic ink ("E-ink") displays, projectors, or other types of display devices. In some instances, the display 133 can be a component of the client device 106 or can be connected to the client device 106 through a wired or wireless connection.

The client device 106 can execute various applications such as a client application 139 or other applications. The client application 139 can be executed in a client device 106 to access network content served up by the computing environment 103 or other servers, thereby rendering a user interface 143 on the display 133. To this end, the client application 139 can include a browser, a dedicated application, or other executable, and the user interface 143 can include a network page, an application screen, or other user mechanism for obtaining user input. The client device 106 can be configured to execute applications beyond the client application 139, such as social networking applications, camera applications, word processors, spreadsheets, or other applications.

The client application 139 can be a camera application, a word processor application, scanning applications, a unique OCR application, or other applications that can be executed to launch the OCR engine 113. The client application 139 can be executed to launch the OCR engine 113 as well as the mode engine 116. The client application 139 can also be executed to send a request to the mode engine 116 to generate a new pattern. The client application 139 can be executed to generate or receive training data 131 and send the training data 131 to the mode engine 116. Next, the client application 139 can receive a score prompt from the mode engine 116 and be executed to send a score back to the mode engine 116. In addition, the client application 139 can be executed to receive the image text 119, the occurrence list 129, or other data from the data store 123 in the computing environment 103.

Next, a general description of the operation of the various components of the network environment 100 is provided. To begin, a client application 139 can obtain a request from a user to identify text in an image. Such a request can be initiated by a user interface 143 generated by the client application 139 and presented to a user. In some embodiments, the client application 139 can obtain the image from another application, such as a camera application or photo viewer, or from the operating system of the client device 106. The client application 139 can send the image to the OCR engine 113. The OCR engine 113 can obtain the image from the client application 139 and identify text in the image. The OCR engine 113 can send the image text 119 obtained from the image, back to the client application 139. Further information about the execution of the OCR engine 113 is further described in the description of FIG. 3.

Next the client application 139 can send the image text 119 to the mode engine 116 for processing. In some embodiments, the OCR engine 113 can send the image text 119 directly to the mode engine 116 for processing. The mode engine 116 can obtain the image text 119 and process the image text 119 to identify the information of interest to the user. To do this, the mode engine 116 can select a pattern detection mode 126. The pattern detection mode 126 can be selected based at least in part on a user account. The selected pattern detection mode 126 is associated with a pattern 136 that the mode engine 116 will use to identify the information of interest. In some embodiments, the pattern detection mode 126 defines a format for a plurality of consecutive characters. In some embodiments, the mode engine 116 can select the pattern detection mode 126 from a plurality of pattern detection modes 126. The plurality of pattern detection modes 126 can include an email address mode, a date mode, a phone number mode, a web domain mode, a street address mode, a personal identification number (PIN) mode, a time mode, a username mode, a plain text mode, and/or other modes corresponding to a searchable string of characters. In some embodiments, the plurality of pattern detection modes can be customized based at least in part on a user account. In some embodiments, the user can select the pattern detection mode 126 via the user interface 143, and the client application 139 can transmit the user's selection to the mode engine 116.

In some embodiments, the mode engine 116 can select the pattern detection mode 126 autonomously based at least in part on a plurality of context factors 130 associated with a user account. In one nonlimiting example, if the user initiates a request to identify text in an image while in the midst of drafting an email, the mode engine 116 can analyze the draft email to recognize context and references made by the user (such as mention of websites or contact numbers) to select the web domain mode or the phone number mode respectively. In addition, the location of the user's cursor (for example, in the "TO:" field in a draft email) can be used to select the likely preferred mode (e.g., email address mode).

The mode engine 116 can also use a combination of context factors 130 to autonomously select the pattern detection mode 126. For example, the mode engine 116 can autonomously select the web domain mode if the user initiates the request to identify text in an image from a web browser application and if the user has previously selected the web domain mode when using the web browser application. In some embodiments, the mode engine 116 can recognize a user's patterns of behavior at a given time of day, on a given day of the week, or in a given location. In another nonlimiting example, if a user selects the address mode to scan addresses from a printed sheet of paper at the beginning of the users' shift every weekday, the mode engine 116 can recognize this behavior pattern and autonomously select the address mode on weekday mornings when the user is at the same workplace location.

After the mode engine 116 has selected a pattern detection mode 126, the mode engine 116 can identify one or more occurrences of the pattern 136 within the image text 119. In some embodiments, the mode engine 116 can identify every occurrence of the pattern 136 within the image text 119. In some embodiments, the mode engine 116 can compare the image text 119 to the pattern 136 associated with the pattern detection mode 126. In some embodiments, the mode engine 116 parses through the image text 119 for occurrences of the pattern 136. In some embodiments, the mode engine 116 parses through the image text 119 while matching regular expressions associated with the selected pattern detection mode 126. Whenever a match or occurrence is found, the mode engine 116 can save the same to an occurrence list 129. The mode engine 116 can send the occurrence list 129 to a display 133. In some embodiments, the mode engine 116 sends the occurrence list 129 once all the image text 119 has been parsed. In some embodiments, the mode engine 116 sends the occurrence list 129 and corresponding updates in real time as the mode engine 116 finds and saves occurrences of the pattern 136.

In some embodiments, the mode engine 116 can generate new modes. A user can initiate a request through the user interface 143 to generate a new mode for detecting a new pattern. In response to obtaining the request, the client application 139 can obtain training data 131. In some embodiments, the client application 139 can generate a prompt for training data 131 and a user can upload training data 131. In some embodiments, the client application 139 can obtain training data 131 from a data store 123. The client application 139 can store the training data 131 in a data store 123. The client application 139 can also generate a request for a new pattern. The client application 139 can send the request for a new pattern to the mode engine 116.

The mode engine 116 can obtain a request to generate a new pattern. In some embodiments, the mode engine 116 can obtain the request to generate a new pattern from the client application 139. In some embodiments, the mode engine 116 can obtain the training data 131 from a data store 123. In some embodiments, the mode engine 116 can obtain the training data 131 from the client application 139. The mode engine 116 can generate a test pattern based at least in part on the training data 131. The mode engine 116 can identify one or more occurrences of the test pattern within the image text 119 of a sample image. The mode engine 116 can save the one or more occurrences of the test pattern in a test list. The mode engine 116 can generate a prompt for a score on the test list. In some embodiments, the mode engine 116 can send the prompt to the client application 139. In some embodiments, the mode engine 116 can send the prompt to the display 133. A user can initiate a score response through the user interface 143 where the score response includes a score based at least in part on the accuracy of the test list. In some embodiments, the client application 139 can send the score to the mode engine 116. The mode engine 116 can obtain the score. The mode engine 116 can create a new pattern 136 based at least in part on the test pattern and the corresponding score.

In some embodiments, the mode engine 116 can repeat these steps until the mode engine 116 obtains a score which meets or exceeds a threshold value. In some embodiments, the mode engine 116 can repeat these steps a specified number of times. In some embodiments, the mode engine 116 can repeat these steps until a request for completion is obtained. Once a new pattern 136 has been created, the mode engine 116 can generate a new pattern detection mode 126 and add the new pattern detection mode 126 to the plurality of pattern detection modes 126.

Figure 2:
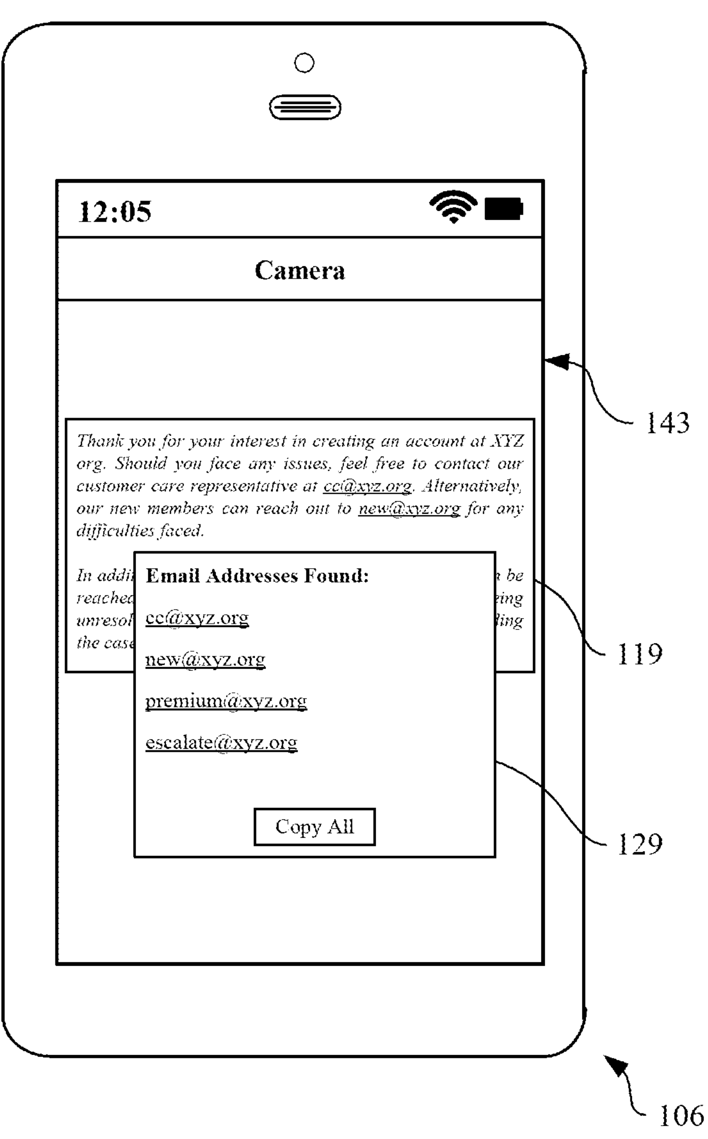
FIG. 2 is a drawing of an example user interface illustrating a list of occurrences generated in the network environment of FIG. 1 according to various embodiments of the present disclosure.

Moving next to FIG. 2, shown is an example user interface 143 that can be rendered by a client application 139 executed by a client device 106 according to various embodiments of the disclosure. The user interface 143 corresponds to an image of a document containing text which has been converted to image text 119 and is rendered by the client application 139. In some embodiments, the image of text is sent by the client application 139 to the OCR engine 113 and converted to machine-encoded image text 119 which is then sent to the client application 139. In one example, the mode engine 116 can obtain the image text 119, select a pattern detection mode 126, and identify occurrences of the pattern 136. The mode engine 116 can save the occurrences to an occurrence list 129 and send the occurrence list 129 to the client application 139 to be rendered on the user interface 143. As shown in the example of FIG. 2, the occurrence list 129 presents to a user each occurrence of the pattern 136 corresponding to the pattern detection mode 126. In the example of FIG. 2, the pattern 136 corresponds to email addresses.

Figure 3:
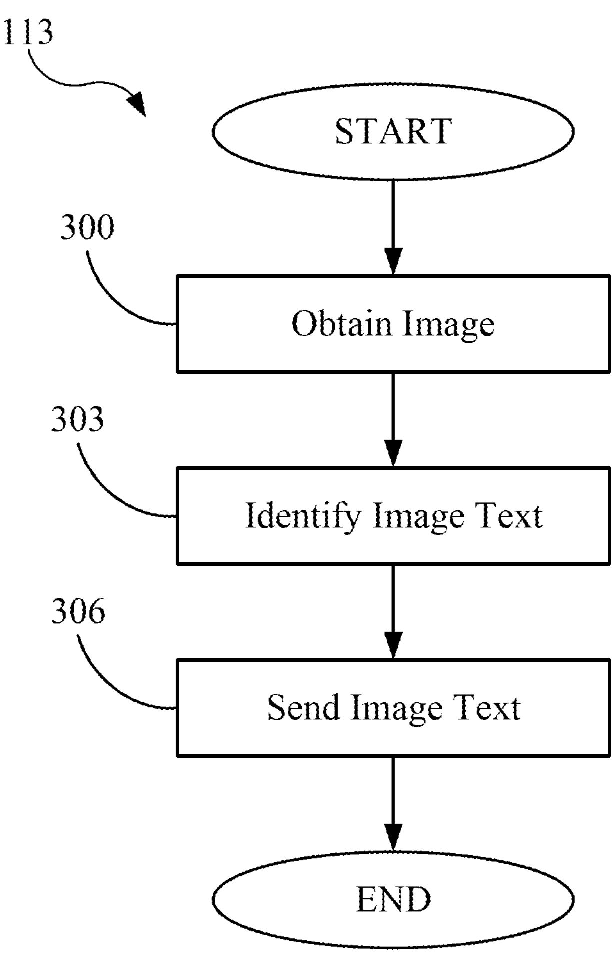
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the OCR engine 113 according to various embodiments. It is understood that the flowchart of FIG. 3 provides merely an example of the many different types of functional arrangements that can be employed to implement the operation of the portion of the OCR engine 113 as described herein. As an alternative, the flowchart of FIG. 3 can be viewed as depicting an example of elements of a method implemented in the computing environment 103 (FIG. 1) according to one or more embodiments.

Beginning with block 300, the OCR engine 113 can obtain an image. In some embodiments, the image is obtained from the client application 139. In some embodiments, the image is obtained from a data store 123. In some embodiments, the image is obtained from an application in the computing environment 103, an application on the client device 106, or an application from a third-party device. In some embodiments, the OCR engine 113 can be obtain image files (e.g., JPG, PNG, BMP, TIFF, GIF, EPS, RAW, etc.), Portable Document Format ("PDF") files, or other similarly difficult to interpret file types.

At block 303, the OCR engine 113 can identify text in the image. The OCR engine 113 can convert the image into machine-encoded image text 119. In some embodiments, the OCR engine 113 can recognize a plurality of text in an image and convert it into machine-encoded image text 119. In some embodiments, the OCR engine 113 can recognize symbols, equations, and other characters in the image.

At block 306, the OCR engine 113 can send the image text 119. In some embodiments, the image text 119 can be sent to the client application 139, to the mode engine 116, or to another application. In some embodiments, the image text 119 can be sent to a data store 123. In some embodiments, the image text 119 can be sent to a display 133. After block 306, the flowchart of FIG. 3 ends.

Figure 4:
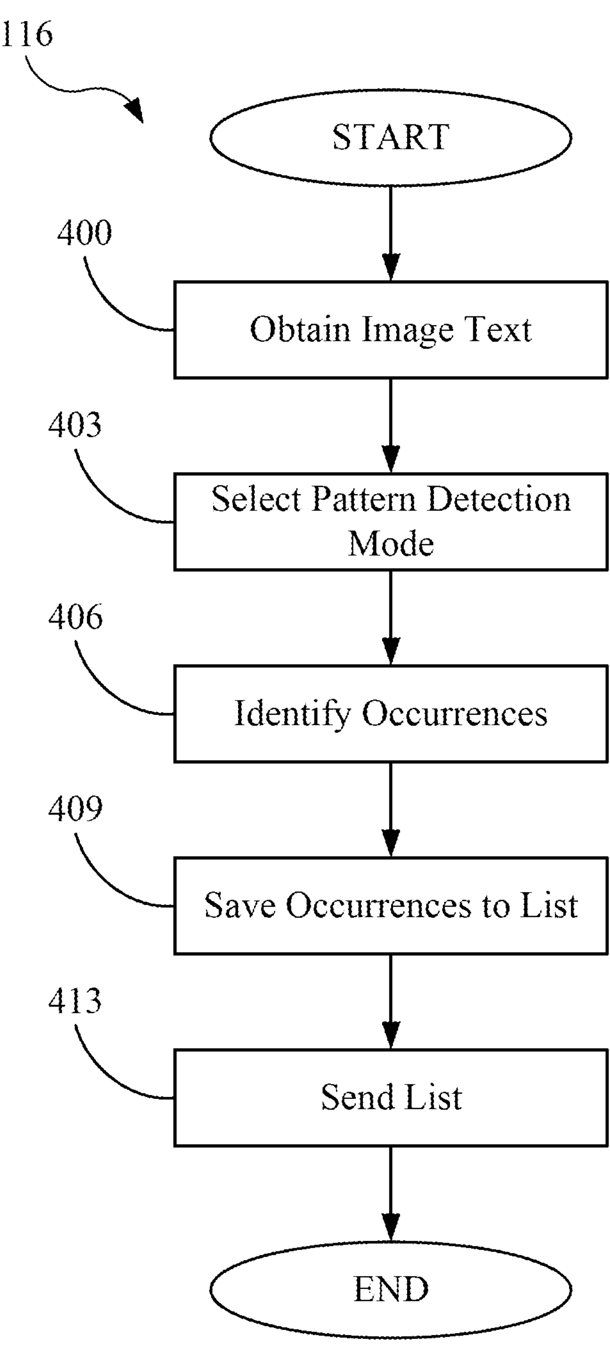
FIG. 4 is a flowchart illustrating one example of functionality implemented as portions of an application executed in a computing environment in the network environment of FIG. 1 according to various embodiments of the present disclosure.

Referring next to FIG. 4, shown is a flowchart that provides one example of the operation of a portion of the mode engine 116 according to various embodiments. It is understood that the flowchart of FIG. 4 provides merely an example of the many different types of functional arrangements that can be employed to implement the operation of the portion of the mode engine 116 as described herein. As an alternative, the flowchart of FIG. 4 can be viewed as depicting an example of elements of a method implemented in the computing environment 103 (FIG. 1) according to one or more embodiments.

Beginning with block 400, the mode engine 116 can obtain image text 119. In some embodiments, the mode engine 116 can obtain the image text 119 from the OCR engine 113, the client application 139, a data store 123, or some other application or data structure. In some embodiments, the mode engine 116 can obtain the image text 119 from the operating system of the computing environment 103.

At block 403, the mode engine 116 can select a pattern detection mode 126. In some embodiments, the mode engine 116 can select a pattern detection mode 126 by obtaining a user selection through a user interface 143. The mode engine 116 can generate a mode selection prompt to send to the client application 139 to be transmitted to the display 133. In some embodiments, the mode engine 116 can select a pattern detection mode 126 autonomously based at least in part on one or more context factors 130 associated with a user account. In some embodiments, the mode engine 116 can autonomously select a pattern detection mode 126 based at least in part on a mode selection history, a user interaction history, a client device location, a time, a date, the image text 119, or other data and information that provides context regarding the likely mode selection preferred by the user. In some embodiments, the mode engine 116 can select a pattern detection mode 126 based at least in part on a user's patterns of behavior at a given time of day, on a given day of the week, or in a given location. In some embodiments, the mode engine 116 can autonomously select a pattern detection mode 126 based at least in part on cross matching the image text 119 with each pattern 136 associated with each of the plurality of pattern detection modes 126.

At block 406, the mode engine 116 can identify, within the image text 119, occurrences of the pattern 136 associated with the selected pattern detection mode 126. In some embodiments, the mode engine 116 can parse through the entire image text 119, matching the pattern 136 against the body of the image text 119. In some embodiments, the mode engine 116 can parse through the image text 119, matching one or more regular expressions associated with the pattern 136 against the body of the image text 119. In some embodiments, the mode engine 116 can include a machine learning model which can be used for pattern recognition and matching to identify each occurrence of the pattern 136 in the image text 119.

At block 409, the mode engine 116 can save the occurrences to an occurrence list 129. In some embodiments, the mode engine 116 saves each occurrence to the occurrence list 129 as the occurrence is identified (at block 406). Thus, in some embodiments, blocks 406 and 409 can be performed iteratively until the entirety of the image text 119 has been parsed.

At block 413, the mode engine 116 can send the occurrence list 129. In some embodiments, the mode engine 116 can send the occurrence list 129 to a data store 123, to a client application 139, to a display 133, or any other location for data storage, analysis, and/or presentation. After block 413, the flowchart of FIG. 4 ends.

Figure 5:
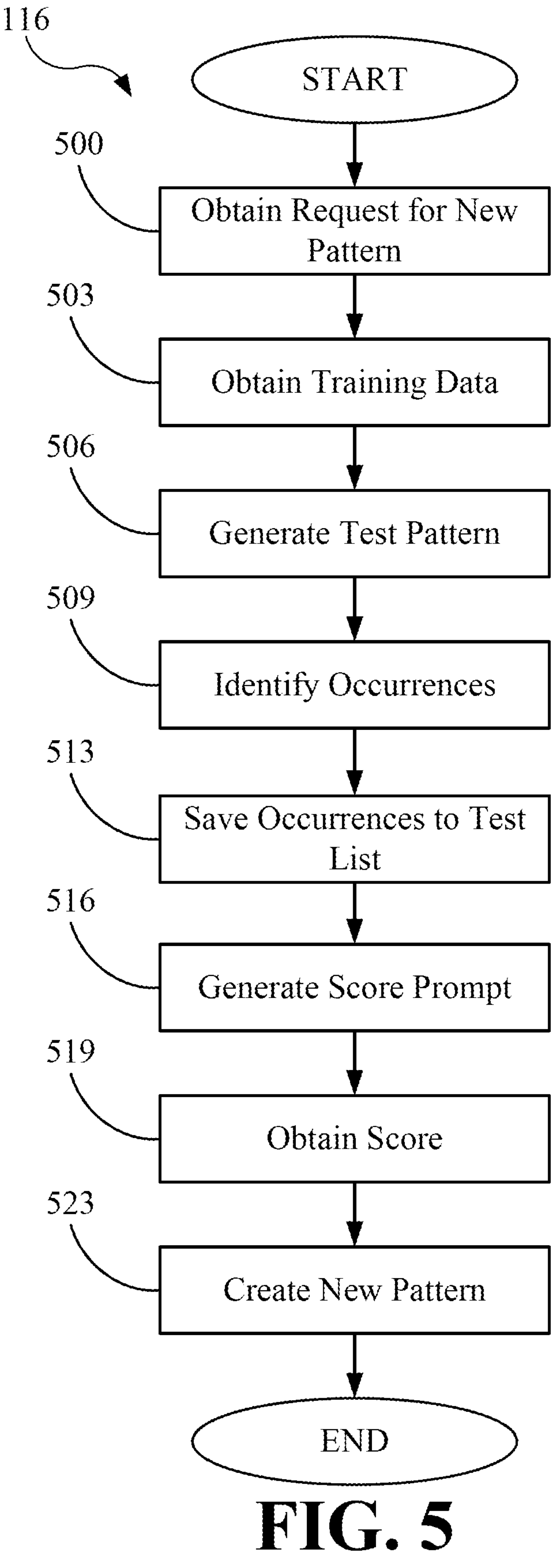
FIG. 5 is a flowchart illustrating one example of functionality implemented as portions of an application executed in a computing environment in the network environment of FIG. 1 according to various embodiments of the present disclosure.

Moving next to FIG. 5, shown is a flowchart that provides one example of the operation of a portion of the mode engine 116 according to various embodiments. It is understood that the flowchart of FIG. 5 provides merely an example of the many different types of functional arrangements that can be employed to implement the operation of the portion of the mode engine 116 as described herein. As an alternative, the flowchart of FIG. 5 can be viewed as depicting an example of elements of a method implemented in the computing environment 103 (FIG. 1) according to one or more embodiments.

Beginning at block 500, the mode engine 116 can obtain a request for a new pattern 136. In some embodiments, the mode engine 116 can obtain a user-initiated request to generate a new pattern 136 or a new pattern detection mode 126 for detecting a new pattern 136. In some embodiments, the mode engine 116 can obtain the request for a new pattern 136 or new pattern detection mode 126 from the client application 139.

At block 503, the mode engine 116 can obtain training data 131. In some embodiments, the mode engine 116 can generate a prompt for training data 131 and send the prompt to a client application 139 or a display 133. In some embodiments, the mode engine 116 can obtain training data 131 from the client application 139. In some embodiments, the mode engine 116 can obtain training data 131 from a data store 123 or from another source.

At block 506, the mode engine 116 can generate a test pattern based at least in part on the training data 131. In some embodiments, the test pattern can be representative of a plurality of patterns 136 identified in the training data 131. In some embodiments, the test pattern can be representative of a plurality of regular expressions identified in the training data 131. In some embodiments, the mode engine 116 can generate a test pattern based at least in part on the training data 131 and the plurality of context factors 130.

At block 509, the mode engine 116 can identify one or more occurrences of the test pattern within the image text 119 of a sample image. In some embodiments, the mode engine 116 can parse through the entire image text 119, matching the test pattern against the body of the image text 119. In some embodiments, the mode engine 116 can parse through the image text 119, matching one or more regular expressions associated with the test pattern against the body of the image text 119. In some embodiments, the mode engine 116 can include a machine learning model which can be used for pattern recognition and matching to identify each occurrence of the test pattern in the image text 119.

At block 513, the mode engine 116 can save the occurrences of the test pattern in a test list. In some embodiments, the mode engine 116 saves each occurrence of the test pattern to the test list as the occurrence is identified (at block 509). Thus, in some embodiments, blocks 509 and 513 can be performed iteratively until the entirety of the image text 119 has been parsed.

At block 516, the mode engine 116 can generate a prompt for a score on the test list. In some embodiments, the prompt can consist of a message, a notification, or alert. In some embodiments, the prompt includes the test list. In some embodiments, the mode engine 116 can send the prompt to a client application 139. In some embodiments, the mode engine 116 can send the prompt to a display 133.

At block 519, the mode engine 116 can obtain a score. In some embodiments, the mode engine 116 can obtain the score based at least in part on the accuracy of the test list. In some embodiments, the mode engine 116 can obtain the score from a client application 139. In some embodiments, the score is obtained from a user-initiated score response through the user interface 143.

At block 523, the mode engine 116 can create a new pattern 136 based at least in part on the test list and the score. In some embodiments, the mode engine 116 can create the new pattern 136 based at least in part on the test pattern. In some embodiments, when the score is above a threshold value, the new pattern 136 is the same as the test pattern. In some embodiments, when the score is below a threshold value, the mode engine 116 repeats blocks 506-519. In some embodiments, the mode engine 116 can repeat these steps a specified number of times. In some embodiments, the mode engine 116 can repeat these steps until a request for completion is obtained. Once a new pattern 136 has been created, the mode engine 116 can generate a new pattern detection mode 126 and add the new pattern detection mode 126 to the plurality of pattern detection modes 126. After block 523, the flowchart of FIG. 5 ends.

Figure 6:
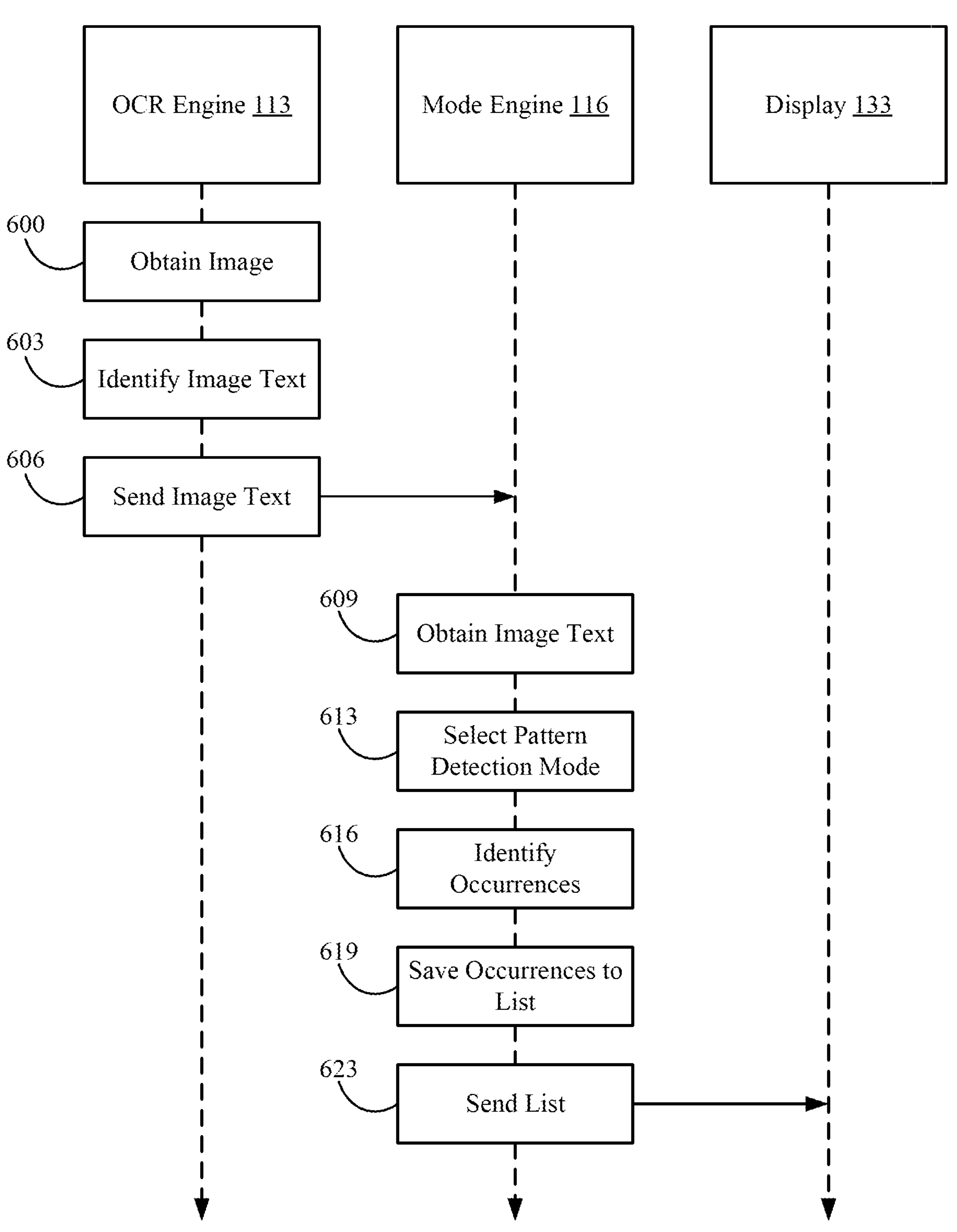
FIG. 6 is a sequence diagram illustrating one example of the interactions between the components of the network environment of FIG. 1 according to various embodiments of the present disclosure.

Moving next to FIG. 6, shown is a sequence diagram illustrating one example of the interactions between the OCR engine 113, the mode engine 116, and the display 133 according to various embodiments. It is understood that the sequence diagram of FIG. 6 provides merely an example of the many different types of functional arrangements that can be employed to implement the operation of the interactions between the OCR engine 113, the mode engine 116, and the display 133. As an alternative, the sequence diagram of FIG. 6 can be viewed as depicting an example of elements of a method implemented within the network environment 100 (FIG. 1) according to one or more embodiments.

Beginning with block 600, the OCR engine 113 can obtain an image. In some embodiments, the image is obtained from the client application 139. In some embodiments, the image is obtained from a data store 123. In some embodiments, the image is obtained from another application.

At block 603, the OCR engine 113 can identify text in the image and convert it into machine-encoded image text 119. At block 606, the OCR engine 113 can send the image text 119 to the mode engine 116. In some embodiments, the image text 119 can be sent to the client application 139. In some embodiments, the image text 119 can be sent to a data store 123. In some embodiments, the image text 119 can be sent to a display 133.

At block 609, the mode engine 116 can obtain the image text 119 from the OCR engine 113. In some embodiments, the mode engine 116 can obtain the image text 119 the client application 139, a data store 123, or some other application or data structure. In some embodiments, the mode engine 116 can obtain the image text 119 from the operating system of the computing environment 103.

At block 613, the mode engine 116 can select a pattern detection mode 126. In some embodiments, the mode engine 116 can select a pattern detection mode 126 by obtaining a user selection through a user interface 143. The mode engine 116 can generate a mode selection prompt to send to the client application 139 to be transmitted to the display 133. In some embodiments, the mode engine 116 can select a pattern detection mode 126 autonomously based at least in part on one or more context factors 130 associated with a user account. In some embodiments, the mode engine 116 can autonomously select a pattern detection mode 126 based at least in part on a mode selection history, a user interaction history, a client device location, a time, a date, the image text 119, or other data and information that provides context regarding the likely mode selection preferred by the user. In some embodiments, the mode engine 116 can select a pattern detection mode 126 based at least in part on a user's patterns of behavior at a given time of day, on a given day of the week, or in a given location. In some embodiments, the mode engine 116 can autonomously select a pattern detection mode 126 based at least in part on cross matching the image text 119 with each pattern 136 associated with each of the plurality of pattern detection modes 126.

At block 616, the mode engine 116 can identify, within the image text 119, occurrences of the pattern 136 associated with the selected pattern detection mode 126. In some embodiments, the mode engine 116 can parse through the entire image text 119, matching the pattern 136 against the body of the image text 119. In some embodiments, the mode engine 116 can parse through the image text 119, matching one or more regular expressions associated with the pattern 136 against the body of the image text 119. In some embodiments, the mode engine 116 can include a machine learning model which can be used for pattern recognition and matching to identify one or more occurrences of the pattern 136 in the image text 119.

At block 619, the mode engine 116 can save the one or more occurrences of the pattern 136 to an occurrence list 129. In some embodiments, the mode engine 116 saves each occurrence to the occurrence list 129 as the occurrence is identified (at block 616). Thus, in some embodiments, blocks 616 and 619 can be performed iteratively until the entirety of the image text 119 has been parsed.

At block 623, the mode engine 116 can send the occurrence list 129 to a display 133. In some embodiments, the mode engine 116 can send the occurrence list 129 to a data store 123, to a client application 139, or any other location for data storage, analysis, and/or presentation. After block 623, the sequence diagram of FIG. 6 ends.

The flowcharts and sequence diagram of FIGS. 3-6 show examples of the functionality and operation of an implementation of portions of the OCR engine 113 and the mode engine 116. If embodied in software, each block may represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as a processor in a computer system or other system. The machine code can be converted from the source code, etc. If embodied in hardware, each block may represent a circuit or a number of interconnected circuits to implement the specified logical function(s).

Although the flowcharts and sequence diagram of FIGS. 3-6 show a specific order of execution, it is understood that the order of execution may differ from that which is depicted. For example, the order of execution of two or more blocks can be scrambled relative to the order shown. Also, two or more successive blocks shown in FIGS. 3-6 can be executed concurrently or with partial concurrence. Further, in some embodiments, one or more of the blocks shown in FIGS. 3-6 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the OCR engine 113 and the mode engine 116, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM), dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein, including the OCR engine 113 and the mode engine 116, can be implemented and structured in a variety of ways. For example, one or more applications described can be implemented as modules or components of a single application. Further, one or more applications described herein can be executed in shared or separate computing devices or a combination thereof. For example, a plurality of the applications described herein may execute in the same computing device and/or client device 106, or in multiple computing devices in the same computing environment 103. Additionally, it is understood that terms such as "application," "service," "system," "engine," "module," and so on can be interchangeable and are not intended to be limiting.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

What is claimed is:

1. A system, comprising:

a computing device comprising a processor and a memory; and machine-readable instructions stored in the memory that, when executed by the processor, cause the computing device to at least:

process an image comprising text by using an optical character recognition (OCR) engine to identify the text in the image and generate machine-encoded text based on the identified text;

select, from a plurality of pattern detection modes, a pattern detection mode associated with a pattern defining a format for a plurality of consecutive characters, wherein selecting the pattern detection mode is based on one or more context factors associated with a user account, wherein the one or more context factors include a user interaction history, a mode selection history, or a client device location associated with the user account;

parse the machine-encoded text to identify one or more occurrences of the pattern associated with the selected pattern detection mode;

generate an occurrence list comprising the one or more occurrences of the pattern identified in the machine-encoded text; and cause a client device associated with the user account to display the occurrence list in a user interface with an option to select the one or more occurrences from the occurrence list.

2. The system of claim 1, wherein the machine-readable instructions further cause the computing device to at least:

obtain a request to generate a new pattern;

generate a test pattern based at least in part on training data;

identify one or more occurrences of the test pattern within the text;

save the one or more occurrences of the test pattern in a test list;

generate a prompt for a score on the test list;

obtain a score based at least in part on the test list; and create the new pattern based at least in part on the test pattern and the score.

3. The system of claim 1, wherein the pattern detection mode is customized based at least in part on the user account.

4. The system of claim 1, wherein the plurality of pattern detection modes comprise at least one of: an email address mode, a date mode, or a phone number mode.

5. The system of claim 1, wherein the selected pattern detection mode is selected by obtaining, from a user interface, a selection of a pattern detection mode.

6. A method, comprising:

processing, by a computing device, an image comprising text by using an optical character recognition (OCR) to identify the text in the image and generate machine-encoded text based on the identified text;

selecting, by the computing device from a plurality of pattern detection modes, a pattern detection mode associated with a pattern defining a format for a plurality of consecutive characters, wherein selecting the pattern detection mode is based on one or more context factors associated with a user account, wherein the one or more context factors include a user interaction history, a mode selection history, or a client device location associated with the user account;

parsing, by the computing device, the machine-encoded text to identify one or more occurrences of the pattern associated with the selected pattern detection mode;

generating, by the computing device, an occurrence list comprising the one or more occurrences of the pattern identified in the machine-encoded text; and causing a client device associated with the user account to display the occurrence list in a user interface with an option to select the one or more occurrences from the occurrence list.

7. The method of claim 6, further comprising:

obtaining, by the computing device, a request to generate a new pattern;

generating, by the computing device, a test pattern based at least in part on training data;

identifying, by the computing device, one or more occurrences of the test pattern within the text;

saving, by the computing device, the one or more occurrences of the test pattern in a test list;

generating, by the computing device, a prompt for a score on the test list;

obtaining, by the computing device, a score based at least in part on the test list; and creating, by the computing device, the new pattern based at least in part on the test pattern and the score.

8. The method of claim 6, wherein the pattern detection mode is customized based at least in part on the user account.

9. The method of claim 6, wherein the plurality of pattern detection modes include at least one of: an email address mode, a date mode, or a phone number mode.

10. The method of claim 6, wherein the selected pattern detection mode is selected by obtaining, from a user interface, a selection of a pattern detection mode.

11. A non-transitory, computer-readable medium, comprising machine readable instructions that, when executed by a processor of a computing device, cause the computing device to at least:

process an image comprising text by using an optical character recognition (OCR) engine to identify the text in the image and generate machine-encoded text based on the identified text;

select, from a plurality of pattern detection modes, a pattern detection mode associated with a pattern defining a format for a plurality of consecutive characters, wherein selecting the pattern detection mode is based on one or more context factors associated with a user account, wherein the one or more context factors include a user interaction history, a mode selection history, or a client device location associated with the user account;

parse the machine-encoded text to identify one or more occurrences of the pattern associated with the selected pattern detection mode;

generate an occurrence list comprising the one or more occurrences of the pattern identified in the machine-encoded text; and cause a client device associated with the user account to display the occurrence list in a user interface with an option to select the one or more occurrences from the occurrence list.

12. The non-transitory, computer-readable medium of claim 11, wherein the machine-readable instructions further cause the computing device to at least:

obtain a request to generate a new pattern;

generate a test pattern based at least in part on training data;

identify one or more occurrences of the test pattern within the text;

save the one or more occurrences of the test pattern in a test list;

generate a prompt for a score on the test list;

obtain a score based at least in part on the test list; and create a new pattern based at least in part on the test pattern and the score.

13. The non-transitory, computer-readable medium of claim 11, wherein the pattern detection mode is customized based at least in part on the user account.

14. The non-transitory, computer-readable medium of claim 11, wherein the plurality of pattern detection modes include at least one of: an email address mode, a date mode, or a phone number mode.

15. The non-transitory, computer-readable medium of claim 11, wherein the selected pattern detection mode is selected by obtaining, from a user interface, a selection of a pattern detection mode.

* * * * *